United States Patent [19]
Smith et al.

[11] Patent Number: 4,872,110
[45] Date of Patent: Oct. 3, 1989

[54] STORAGE OF INPUT/OUTPUT COMMAND TIMEOUT AND ACKNOWLEDGE RESPONSES

[75] Inventors: Michael D. Smith, Palo Alto, Calif.; Richard A. Lemay, Carlisle, Mass.

[73] Assignee: Bull HN Information Systems Inc., Billerica, Mass.

[21] Appl. No.: 92,863

[22] Filed: Sep. 3, 1987

[51] Int. Cl.⁴ .................. G06F 11/34; G06F 13/42
[52] U.S. Cl. .............................. 364/200; 364/240.9; 364/267.9; 364/244.3; 364/245.6
[58] Field of Search ... 364/200 MS File, 900 MS File

[56] References Cited

U.S. PATENT DOCUMENTS

| | | | |
|---|---|---|---|
| 4,220,990 | 9/1980 | Alles | 364/200 |
| 4,426,679 | 1/1984 | Yu et al. | 364/200 |
| 4,475,011 | 10/1984 | Brightman et al. | 379/286 |
| 4,562,533 | 12/1985 | Hodel et al. | 364/200 |
| 4,733,351 | 3/1988 | Peirent | 364/200 |

*Primary Examiner*—Gareth D. Shaw
*Assistant Examiner*—Adolfo L. Ruiz
*Attorney, Agent, or Firm*—Gary D. Clapp; John S. Solakian

[57] ABSTRACT

A data processing system includes a number of subsystems all coupled in common to a system bus and communicate with each other by sending and receiving commands sent over the system bus. A central processing subsystem includes a response memory for storing indication of the responses sent by the receiving subsystem when receiving commands sent by the central processing subsystem. The responses include an acknowledge response, a not acknowledge response or no response--a timeout. Storing the acknowledge response and the timeout will enable the programmer to determine which of the three responses was received.

21 Claims, 5 Drawing Sheets

DATA PROCESSING SYSTEM 1

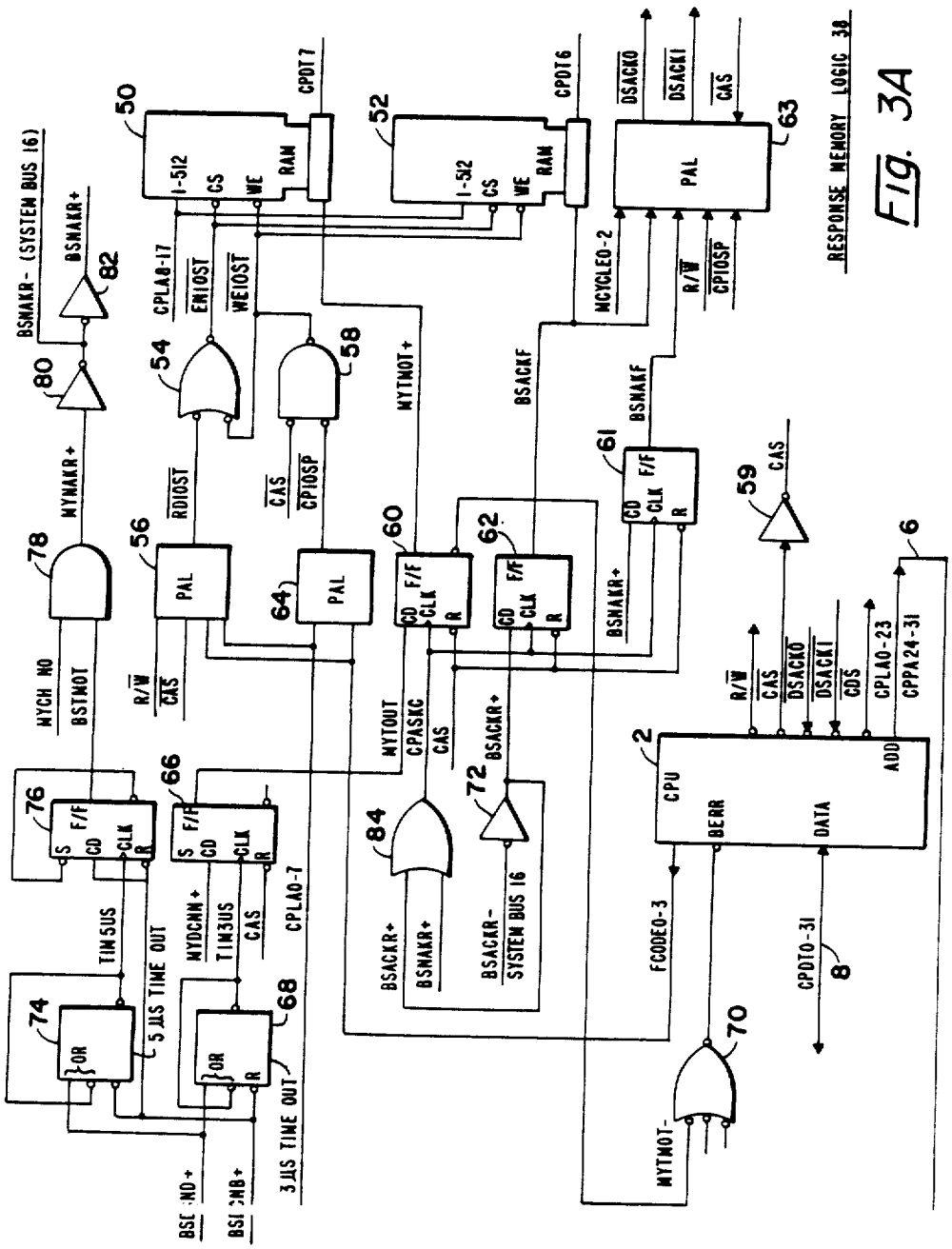

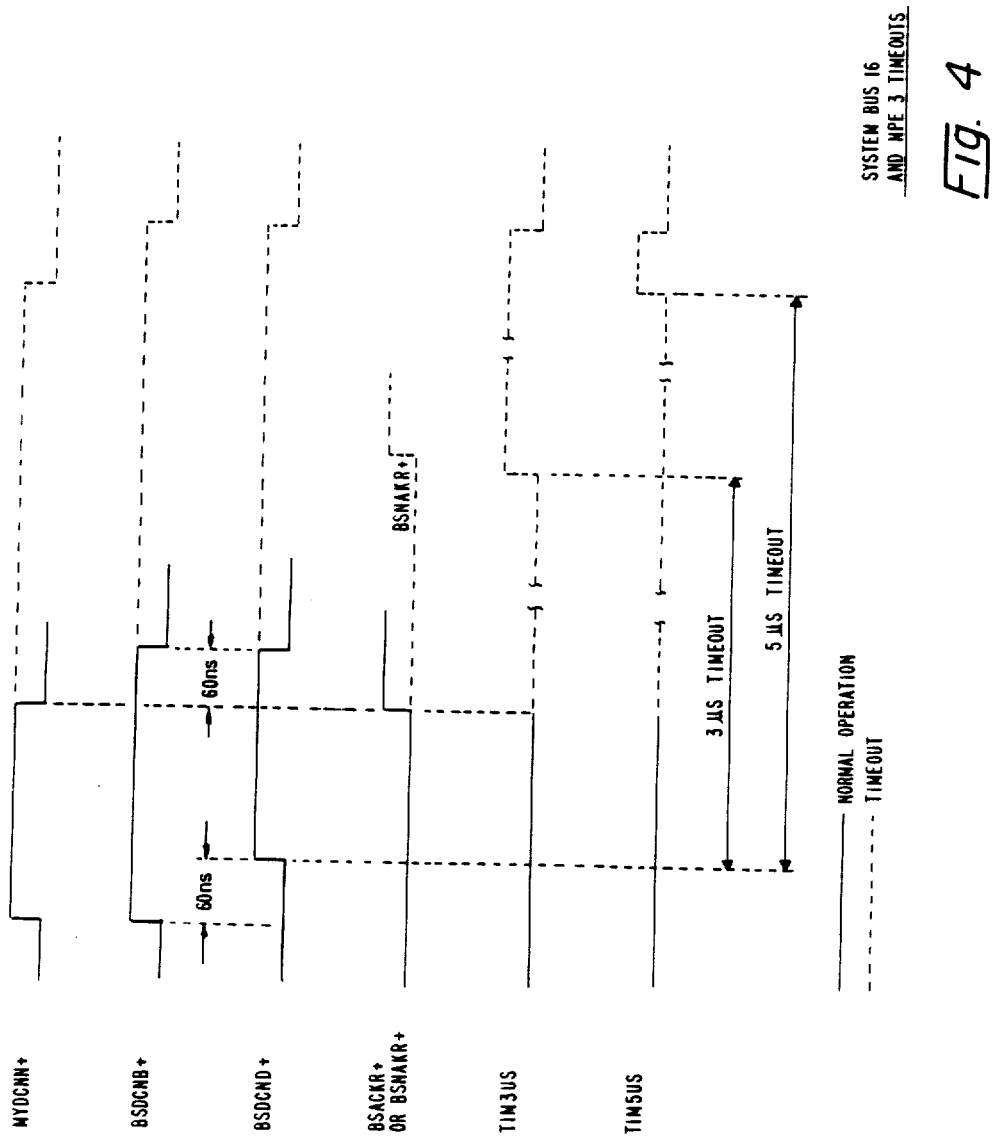

STORAGE OF INPUT/OUTPUT COMMAND TIMEOUT AND ACKNOWLEDGE RESPONSES

BACKGROUND OF THE INVENTION

1. Scope of the Invention

This invention relates generally to data processing systems, and more specifically to apparatus which makes available to the programmer responses to input/output commands.

2. Description of the Prior Art

Many data processing systems include a number of subsystems coupled in common to a system bus. The subsystems may include a number of central processors, a memory subsystem and a number of peripheral subsystems. These peripheral subsystems may include a number of communication subsystems, a number of mass storage subsystems, a number of unit record subsystems, a number of workstation subsystems, and the like.

Any subsystem, a master, may communicate with another subsystem, a slave, by generating a command over the system bus. The command includes a channel number identifying the slave, a function code specifying the operation the slave is to perform and in some commands, data which the slave will use in performing the specified operation. The slave will generate an acknowledge signal over the system bus if the command is received. The master will receive the acknowledge signal from the system bus and disengage itself from the system bus.

Similarly the slave may issue a not acknowledge signal over the system bus to indicate that the slave did not accept the command. The master will receive the not acknowledge signal from the system bus and disengage itself from the system bus. The master then will make a decision whether or not to retry.

It is possible that the slave will not respond to the command. In that event the master will timeout and disengage itself from the system bus. The master may retry the command and if there is still no response, make a decision further to possibly alert the operator of a problem.

However a central processor unit which, as a master, generates many commands to different slaves has a problem of keeping track of the responses to those commands and still maintain its software throughput, particularly when any I/O command may be interrupted by a higher priority command.

OBJECTS OF THE INVENTION

Accordingly, it is an object of the invention to have an improved data processing unit for tracking the responses to commands.

SUMMARY OF THE INVENTION

A data processing system includes a number of central processing subsystems, a memory subsystem and a number of peripheral subsystems all coupled in common to a system bus.

A central processing subsystem communicates with the other subsystems by sending commands over the system bus. The command to the peripheral subsystem (I/O commands) includes a channel number identifying one peripheral subsystem, a function code specifying the operation the peripheral subsystem will perform and possibly data.

The peripheral subsystem may send an acknowledge signal, a not acknowledge signal, or no response back over the system bus. If no response is received the central processing system will time out. The central processing system includes a response memory which stores the acknowledge signal response, or the timeout response in a location specified by the channel number of the peripheral subsystem. A microprocessor in the central processing subsystem reads the contents of the location under software control to determine what response the central processing system received.

The contents of binary 10 at the address corresponding to the channel number of the peripheral subsystems indicates that the command was acknowledged by the peripheral subsystem. The contents of binary 00 indicates that a not acknowledge signal was received. The software can then take the appropriate action. The contents of binary 01 indicates that the peripheral subsystem did not respond. It is possible that there is no peripheral subsystem with that channel number on the system bus.

BRIEF DESCRIPTION OF THE DRAWINGS

The manner in which the method of the present invention is performed and the manner in which the apparatus of the present invention is constructed and its mode of operation can best be understood in light of the following detailed description together with the accompanying drawings in which like reference numbers identify like elements in the several figures and in which:

FIG. 3A shows a detailed logic diagram of the response memory logic.

FIG. 4 shows a timing diagram of the system bus connect logic for the normal and timeout conditions.

DESCRIPTION OF THE PREFERRED EMBODIMENT

Figure 1:
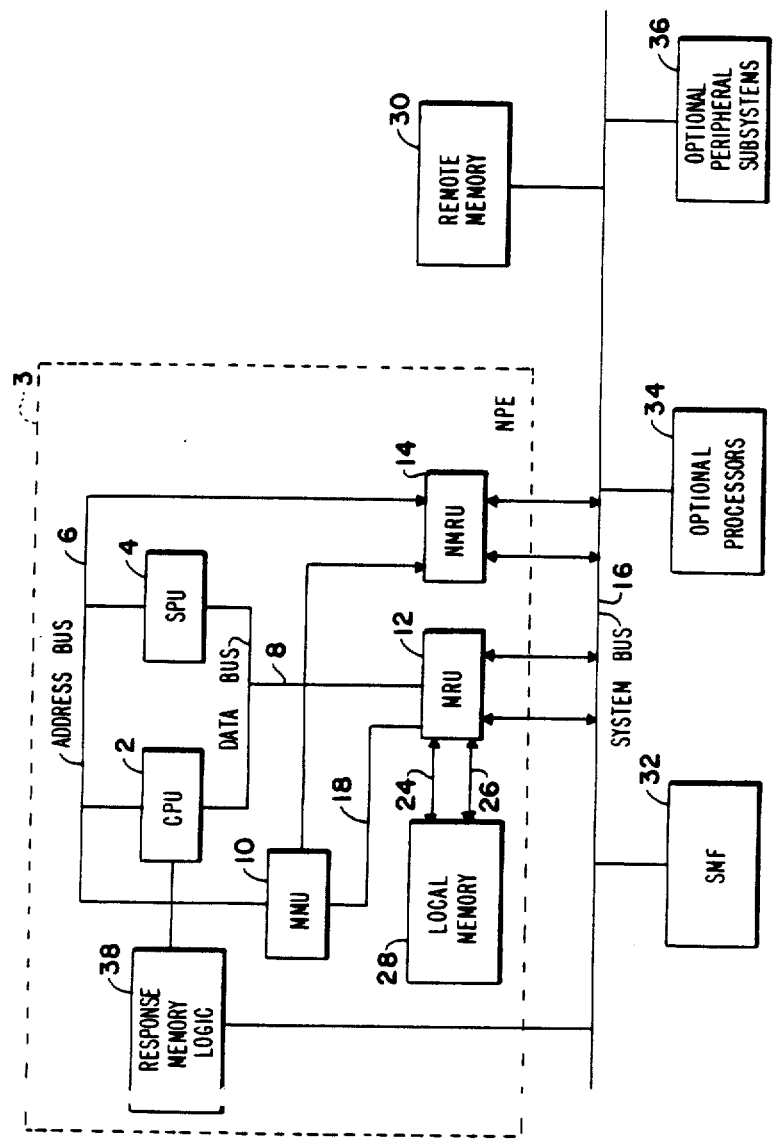
FIG. 1 is an overall block diagram of a data processing system.

FIG. 1 shows a block diagram of a data processing system 1 which includes a system management facility (SMF) 32, a number of optional processors 34, a remote memory 30, a number of optional peripheral subsystems 36 and a non-proprietary subsystem 3, all coupled in common to a system bus 16. The SMF 32 provides start-up and centralized control of the overall data processing system 1. The remote memory 30, the optional processors 34 and the optional peripheral subsystems 36 are conventional in operation.

The non-proprietary system (NPE) 3 which provides a family of platform systems onto which non-proprietary operating systems may be ported. This allows system builders to structure "solutions" by combining a wide range of off-the-shelf applications software with the standard software of the other conventional subsystems that make up data processing system 1. NPE 3 includes a central processing unit (CPU) 2, a scientific processing unit (SPU) 4, a memory management unit (MMU) 10 and a non-memory reference unit 14, all coupled in common to an address bus 6 and a data bus 8. A memory reference unit (MRU) 12 is coupled to data bus 8 and to MMU 10 by physical address bus 18. A local memory 28 is coupled to the MRU 12 via a data bus 24 and an address bus 26. The MRU 12 and NMRU 14 are both coupled to system bus 16.

The CPU 2 is typically a Motorola 68020 microprocessor which generates 32 address signals over address bus 6, receives or generates 32 data signals over data bus 8 and has a number of control leads. The SPU 4 is typically a Motorola 68881 floating point coprocessor. The SPU 4 and CPU 2 cooperate on the execution of floating point instructions. The CPU 2 fetches and decodes the instructions, computes the effective address and initiates operand references. The SPU 4 then executes the instructions.

The MMU 10 is typically a Motorola 68851 paged memory management unit which receives logical addresses from CPU 2 via address bus 6 and generates physical addresses for transfer over bus 18.

The MRU 12 receives physical addresses from the MMU 10 and from system bus 16 and determines whether the local memory 28 or the remote memory 30 locations are addressed. If the transaction is a local memory write, the MRU 12 appends parity to each data byte received from the CPU 2 and stores it in the addressed location in local memory 28. If the transaction is a local memory read, the MRU 12 accesses the data from the addressed location, performs the appropriate parity checks and routes the data to the requesting CPU 2 or SPU 4 or system bus 16.

If the transaction is directed to the remote memory 30, then the MRU 12 send out a command on system bus 16 including address, control and data information for a write operation to remote memory 30. For a read operation the MRU 12 sends the command including the address and control information out on the system bus 16. In this case, the data information (channel number) identifies the sending unit. The response command, therefore, during the second half bus cycle will include the requested data as well as the address of the requesting unit, the channel number.

The NMRU 14 controls all non-memory commands including internal NPE 3 (local) non-memory commands and all non-memory commands on the system bus 16 (remote). Local non-memory commands make a number of registers available to the programmer. Remote non-memory (I/O) commands make available to the programmer a number of registers in the peripheral subsystems, coupled to system bus 16 as well as supply data to the peripheral subsystems. The responses to the I/O commands are received and stored in response memory logic 38.

Figure 2:
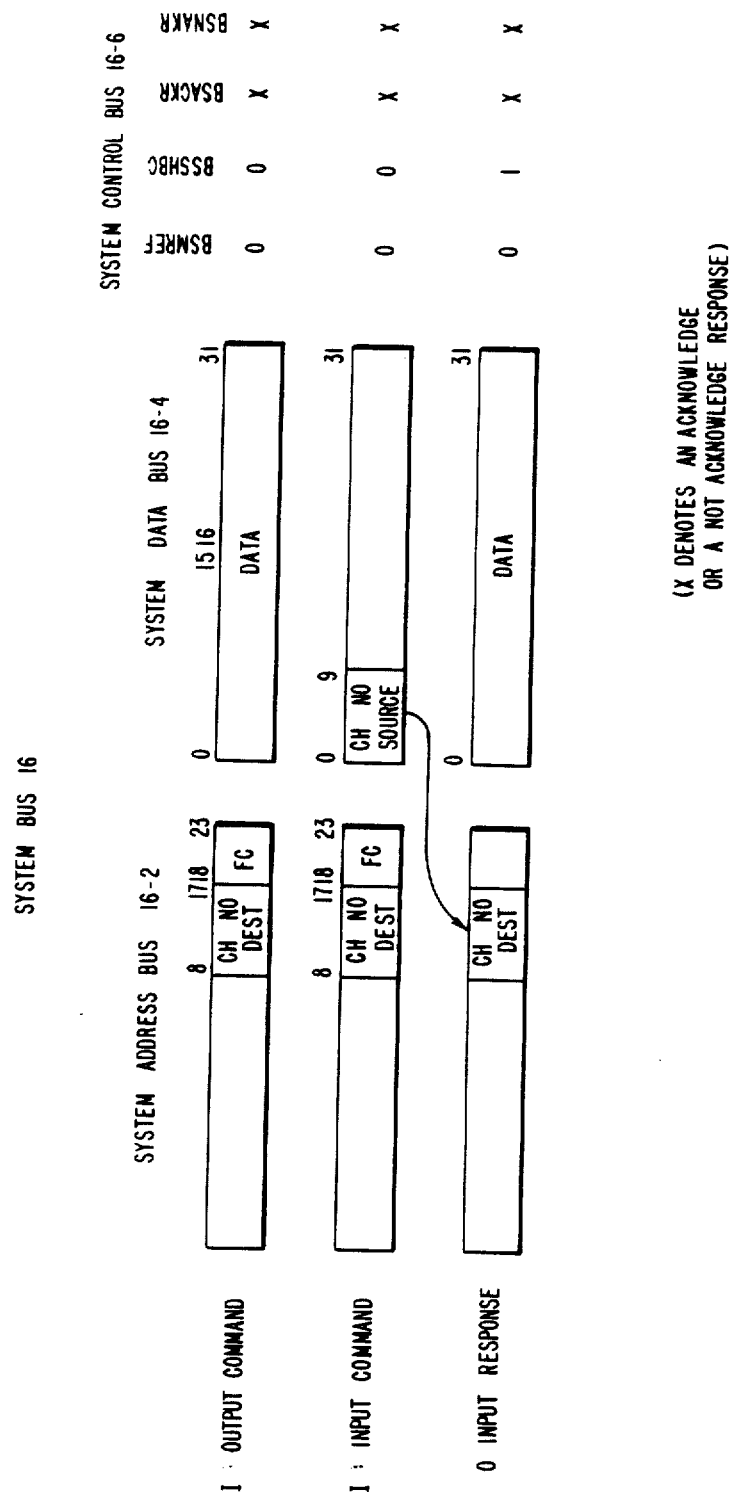
FIG. 2 shows typical I/O command formats.

FIG. 2 shows the format of some typical non-memory commands. An I/O output command, that is one subsystem coupled to system bus 16 sending data to another subsystem coupled to system bus 16, includes the channel number of the receiving subsystem in address bus 16-2 bit positions 8 through 17, a function code in address bus 16-2 bit positions 18 through 23 and data in data bus 16-4 bit positions 0 through 31. Among the control signals on control bus 16-6 are a memory reference signal BSMREF, indicating that this is not a memory 30 command, and a second half bus cycle signal BSSHBC indicating that this is not a response to a previous command. Each subsystem will respond to its unique channel number. The function code indicates the operation the receiving subsystem will perform.

Also shown is an I/O input command with its input response. Note that data bus 16-4 bit positions 0-9 specify the channel number of the sending subsystem. This channel number will appear in the input response command in address bus 16-2 bit positions 8 through 17. Note that signal BSSHBC indicates that this is a response to a previous input command.

A peripheral subsystem 36 will respond to a command which includes its channel number by sending an acknowledge signal BSACKR or a not acknowledge signal BSNAKR. If the NPE 3 does not receive any response a 3 microsecond timeout will generate a timeout signal TIM3US (FIG. 3A) and a 5 microsecond timeout will generate signal TIM5US. System bus 16 includes a 32 bit address bus 16-2, a 32 bit data bus 16-4 and a control bus 16-6. The BSACKR is received and stored in a response memory logic 38 along with an indication of the timeout.

FIG. 3A is a detailed logic diagram of response memory logic 3. When the I/O command is sent out over system bus 16 to a peripheral subsystem, the peripheral subsystem may accept the command and put an acknowledge signal BSACKR back on system bus 16, or reject the command and put a not acknowledge signal BSNAKR back on system bus 16. Or for some reason the command may be ignored and no response is put out on system bus 16. The system bus 16 operation is described in U.S. Pat. No. 4,030,075 entitled "Data Processing System Having Distributed Priority Network".

If no acknowledge or not acknowledge response is received by response memory logic 3, signals BSDCND and BSDCNB applied to the 3 microsecond timer 68 remain high, and signal MYDCNN applied to a CD input terminal of a flop 66 remains high. If these signals remain high for more than 3 microseconds indicating that system bus 16 timed out, then signal TIM3US goes high and a flop 66 sets forcing output signal MYTOUT+ high. After 5 microseconds since signals BSDCND and BSDCNB are still high, a timer 74 will generate signal TIM5US, which sets a flop 76 forcing output signal BSTMOT high.

If the my channel number signal MYCHNO which identifies NPE 3 is high, then an AND gate 78 generates a MYNAKR signal indicating that the NPE 3 timed out. A driver 80 places the not acknowledge signal BSNAKR− out on system bus 16. The signal is immediately received by a receiver 82 which generates the not acknowledge signal BSNAKR+ which is applied to an OR 84.

A flop 60 will set on the rise of clock signal CPASKC since time out signal MYTOUT from flop 66 is high is applied to the CD input terminal. Signal MYTMOT+ is forced high and a binary ONE is written into a random access memory (RAM) 50 at a location specified by signals CPLA 8 through CPLA 17. Signals CPLA 8-17 are generated by CPU 2 and applied to address terminals 1-512 to specify the channel number of the peripheral subsystem receiving the command. The enable signal $\overline{\text{ENIOST}}$ enables RAM 50 and signal $\overline{\text{WEI}}$ $\overline{\text{OST}}$ specifies a write operation. A negative OR gate 54 generates signal $\overline{\text{ENIOST}}$ and a negative AND gate 58 generates signal $\overline{\text{WEIOST}}$. An address strobe signal $\overline{\text{CAS}}$ from CPU 2 is applied to an input terminal and signal $\overline{\text{CPIOSP}}$, which indicates an I/O command, is applied to the other input terminal of negative AND gate 58. A programmable array logic (PAL) 64 generates signal $\overline{\text{CPIOSP}}$ in accordance with the Boolean equation:

$$\overline{\text{CPIOSP}} = \overline{\text{FCODE 2}} \cdot \overline{\text{FCODE 1}} \cdot \text{FCODE 0} \cdot \text{CPLA}$$
0 through CPLA 7

Signals FCODE 0–2 are generated by CPU 2 and indicate the processor state as a supervisor data space when at octal 5. Address signals CPLA 0 through CPLA 7 are generated by the CPU 2 as hexadecimal FF.

Read signal $\overline{RDIOST}$ and write signal $\overline{WEIOST}$ are applied to the input terminals of negative OR gate 54. Signal $\overline{RDIOST}$, the output of PAL 56, is generated in accordance with the Boolean equation:

$$\overline{RDIOST} = \overline{CAS} . R/\overline{W} . FCODE\ 2 . \overline{FCODE\ 1} .$$
$$FCODE\ 0 . CPLA\ 0–7$$

These signals are all generated by CPU 2. Signal $\overline{CAS}$ is an address strobe signal, signal $R/\overline{W}$ specify a read operation, signals FCODE 0–2 at octal 5 specifies a supervisor data processor state and address signals CPLA 0–7 are at hexadecimal FF.

If an acknowledge signal BSACKR— were received in response to the command sent out on the system bus 16 by NPE 3, then a flop 62 would set on the rise of clock signal CPASKC. Signal BSACKR— is applied to a driver 72, which generates signal BSACKR+, which is in turn applied to the CD input terminal of flop 62. Output signal BSACKF forces a binary ONE to be written into a RAM 52 at a location specified by the signals CPLA 8–17 which indicate the channel number of the peripheral subsystem which acknowledged the command.

NPE 3 receiving either signal BSACKR or BSNAKR results in the resetting of timers 68 and 74 by forcing signals BSDCND and BSDCNB low (FIG. 4). Also flop 76 is reset when signal BSDCNB goes low.

In the event of a system bus 16 timeout signal MYTMOT— from flop 60 is applied to the bus error terminal BERR of CPU 2 via a negative OR gate 70, the CPU 2 will then initiate an exception handling operation which may be a retry operation.

The CPU 2 may read the contents of the location in RAM's 50 and 52 by generating read signal $\overline{RDIOST}$, enable signal $\overline{ENIOST}$ and address signals CPLA 8–17 to specify the channel number. The output, data signals CPDT 6 and CPDT 7 are available to the CPU 2. Signals CPDT 6 and CPDT 7 at binary 00 respectively indicates that the command was refused (not acknowledged); binary 10 indicates that the command was accepted (acknowledged); and binary 01 indicates that no peripheral subsystem responded to the channel number in the command.

Address strobe signal CAS, the output of an inverter 59, is applied to the reset terminals of flops 60, 61, 62 and 66 and remains high until either the acknowledge signal BSACKF or the not acknowledge signal BSNAKF is generated. Flop 61 is set on the rise of the clock signal CPASKC when the not acknowledge signal BSNAKR+ is applied to the CD terminal.

Output signals BSNAKF and BSACKF from flops 61 and 62 respectively, are applied to a PAL 63. Also applied to PAL 63 are signals $R/\overline{W}$ and $\overline{CAS}$ from CPU 2, signal MCYCLE 0, MCYCLE 1 and MCYCLE 2, and signal $\overline{CPIOSP}$. PAL 63 generates signals $\overline{DSACK\ 0}$ and $\overline{DSACK\ 1}$ which are applied to CPU 2 to indicate the end of the system bus 16 cycle. CPU 2 then sets signal $\overline{CAS}$ high, which sets signal CAS low, thereby resetting flops 60, 61, 62 and 66.

PAL 63 generates signals DSACK 0 and DSACK 1 in accordance with the Boolean equation:

$$\overline{DSACK\ 0} = \overline{CAS}(R/\overline{W} . \overline{CPIOSP} . \overline{MCYCLE\ 2} .$$
$$MCYCLE\ 1 . \overline{MCYCLE\ 0} .$$
$$(BSACKF + BSNAKF))$$

Signal $\overline{DSACK\ 0}$ is active at address strobe time, signal $\overline{CAS}$ low. Signal $\overline{CPIOSP}$ indicates that this is an I/O command. Signals $\overline{MCYCLE\ 2}$, MCYCLE 1 and $\overline{MCYCLE\ 0}$ at octal 2 indicates that the CPU 2 is sending an I/O write command out on system bus 16. Signal $R/\overline{W}$ indicates a write operation.

$$\overline{DSACK\ 1} = \overline{CAS}(R/\overline{W} . \overline{CPIOSP} . \overline{MCYCLE\ 2} .$$
$$\overline{MCYCLE\ 1} . MCYCLE\ 0 .$$
$$(BSACKF + BSNAKF)$$

Signal $R/\overline{W}$ indicates that this is a read operation and signals $\overline{MCYCLE\ 2}$, $\overline{MCYCLE\ 1}$ and MCYCLE 0 at octal 1 indicates that the CPU 2 is sending an I/O read command out on system bus 16.

Note that CPU 2 sent and received 32 data bits CPDT 0–31 over data bus 8 and 32 address bits CPLA 0–23 and CPPA 24–31 over address bus 6.

Figure 3B:
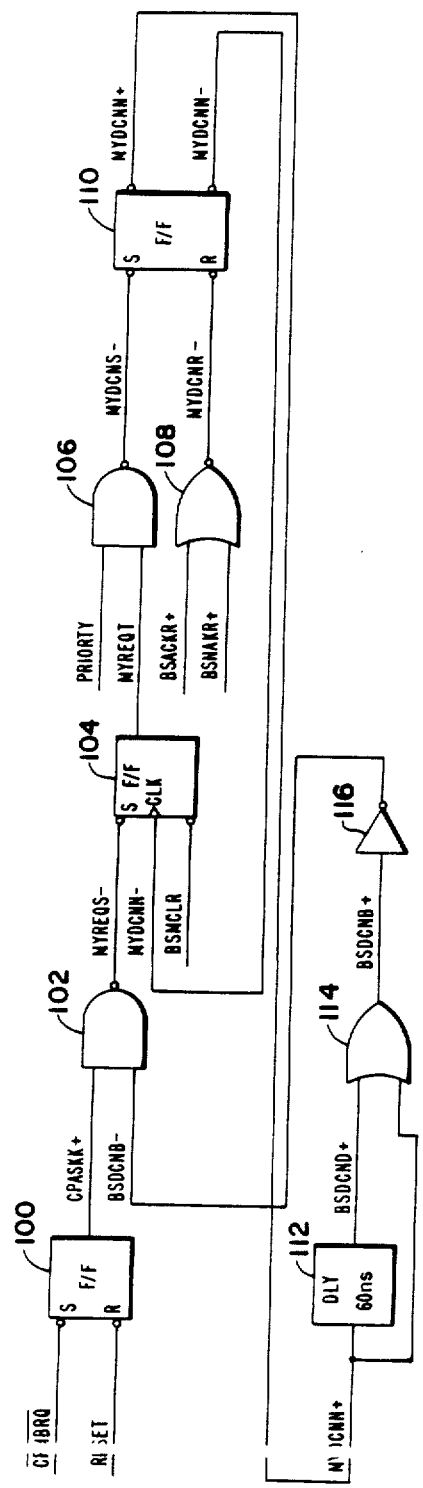
FIG. 3B shows the bus connect logic.

FIG. 3B shows the detailed logic for coupling the NPE 3 to system bus 16. The CPU 2 bus request signal $\overline{CPMBRQ}$ is generated in accordance with the following Boolean equation:

$$\overline{CPMBRQ} = \overline{CAS} . \overline{CPIOSP}(R/\overline{W} + \overline{R/W} . \overline{CDS})$$

Signal CAS indicates the address strobe from CPU 2, signal $\overline{CPIOSP}$ indicates that this is an I/O command, signal $R/\overline{W}$ indicates a read operation signal $\overline{R/W}$ indicates a write operation and signal $\overline{CDS}$ indicates a data strobe from CPU 2.

A flop 100 sets when bus request signal $\overline{CPMBRQ}$ goes low. Output signal CPASKK+ is forced high, forcing output signal MYREQS— from a NAND gate 102, low. Bus connect signal BSDCNN— is high at this time.

Signal MYREQS— goes low setting flop 104. This forces output signal MYREQT high. If the NPE 3 has the highest priority of the subsystem requesting the system bus 16, then signal PRIORITY is high. This forces the output signal MYDCNS— from NAND gate 106 low setting a flop 110. Output signals MYDCNN+ and MYDCNN— connect NPE 3 to system bus 16 to send the I/O command stored in registers (not shown) out on system bus 16 to a peripheral subsystem which will respond to the channel number of the I/O command.

The my data cycle now signal MYDCNN+ is applied to a delay line 112 and an OR gate 114 to generate the bus timing signals BSDCND+ and BSDCNB+ of FIG. 4. An inverter 116 forces signal BSDCNB— low, forcing signal MYREQS— high.

The system bus 16 cycle is concluded when either the acknowledge signal BSACKR+ or the not acknowledge signal BSNAKR+ is received by a NOR gate 108 and output signal MYDCNR— resets flop 110. Flop 104 resets on the rise of signal MYDCNN— and flop 100 is reset by signal RESET at the end of the bus cycle.

FIG. 4 shows a timing diagram of the bus connect signals MYDCNN+, BSDCNB+ and BSDCND+ to show the normal timing and the effect of the system bus 16 3 microsecond timeout and the NPE 3 5 microsecond timeout on the these signals. The logic showing the generation of the bus connect signals is not shown in detail since it is described in the aforementioned U.S. Pat. No. 4,030,075. However that portion of the logic needed to describe the invention to one of ordinary skill in the art is fully described.

Referring to FIG. 4, solid lines show the normal operation of the signals that connect and time NPE 3 to system bus 16. The dotted lines assume that no response was received from the peripheral subsystem that was to receive the command sent out by NPE 3.

Assuming normal operation (solid lines), the my data cycle now signal MYDCNN+, goes high to connect NPE 3 to system bus 16 and send the I/O command out on system bus 16. At the same time, timing signal BSDCNB+ goes high. After a delay of 60 nanoseconds, strobe signal BSDCND+ goes high. Both signals high start the 3 microsecond timer 68 and the 5 microsecond timer 74.

The I/O command is sent out over system bus 16 to the peripheral subsystems on the rise of signal MYDCNN. The peripheral subsystem recognizes its channel number and sends back the acknowledge signal BSACKR+ or the not acknowledge signal BSNAKR+. This results in signal MYDCNN+ going low to disconnect NPE 3 from system bus 16. Sixty nanoseconds after the fall of signal MYDCNN+, signals BCDCNB+ and BSDCND+ go low. Signal BSDCNB+ going low resets both timers 68 and 74.

Assuming that neither the acknowledge or nor the not acknowledge signals BSACKR+ or BSNAKR+ are received from the peripheral subsystem, then signals MYDCNN+, BSDCNB+ and BSDCND+ remain high. After 3 microseconds, signal TIM3US goes high setting flop 66 and forcing output signal MYTOUT high. Five microseconds later signal TIM5US goes high setting flop 76, which forces the not acknowledge signal BSNAKR+ high. Signals MYDCNN+, BSDCNB+ and BSDCND+ go low as before, resetting the timers 68 and 78 and resetting flop 76.

While the invention has been shown and described with reference to the preferred embodiment thereof, it will be understood by those skilled in the art that the above and other changes in form and detail may be made therein without departing from the spirit and scope of the invention.

What is claimed is:

1. A data processing system for storing responses to an input/output command comprising:
   A. A system bus;
   B. A processor subsystem coupled to said system bus for generating said input/output command, said command including a channel number;
   C. a plurality of peripheral subsystems coupled to said system bus, one of said plurality of subsystems being responsive to said channel number for accepting said command and generating an acknowledge response when said command is accepted and generating a not acknowledge response when said command is rejected;
   D. said processor subsystem including:
      central processor means for coupling said processor subsystem to said system bus;
      storing means coupled to said system bus for receiving said acknowledge and not acknowledge responses for storage at a location specified by said channel number;
      timeout means coupled to a line of said system bus conducting said not acknowledge response, said timeout means responsive to said input/output commands and to said acknowledge and not acknowledge responses for generating a timeout response on said system bus line in substitution for said not acknowledge response when said acknowledge response is not received within a predetermined time,
      said processor subsystem being responsive to said timeout response in the same manner as to said not acknowledge response, including storing said timeout response in said location in substitution for said not acknowledge response.

2. The system of claim 1 wherein said storing means includes:
   first memory means for storing a first binary bit at said location when said acknowledge response is received; and
   second memory means for storing a second binary bit at said location when said acknowledge or said not acknowledge response is not received by said predetermined time.

3. The system of claim 2 wherein said central processing means generates channel number signals indicative of said channel number, and a plurality of control signals.

4. The system of claim 3 wherein said storing means comprises:
   first flop means coupled to said system bus for receiving an acknowledge signal indicative of said acknowledge response,
   logic means coupled to said central processor means and responsive to said plurality of control signals for generating a write signal and an enable signal,
   said first memory means coupled to said first flop means, said central processor means and said logic means and responsive to said acknowledge signal, said channel number signals, said write signal and said enable signal for storing a binary ONE at a location specified by said channel number signals.

5. The system of claim 4 wherein said timeout means comprises:
   first timer means for starting a first timeout when said command is sent out over said system bus and resetting said first timeout when said acknowledge or said not acknowledge response is received by said first timer means, and said first timer means generating a first timeout signal when said acknowledge or said not acknowledge response is not received by a first predetermined time.

6. The system of claim 5 wherein said timeout means further comprises:
   second timer means for starting a second timeout when said command is sent over said system bus and resetting said second timeout when said acknowledge or said not acknowledge response is received by said second timer means, and generating said not acknowledge signal when said acknowledge or said not acknowledge response is not received by said predetermined time.

7. The system of claim 6 wherein said second memory means is responsive to said first timeout signal, said channel number signals, said write signal and said enable signal for storing a binary ONE at said location specified by said channel number signals.

8. The system of claim 7 wherein said central processor means is responsive to said first timeout signal for initiating an exception handling operation.

9. The system of claim 8 wherein said first timer means includes a first timer means responsive to a first bus connect signal in a first state and a second bus connect signal in a first state for starting said first timeout, and responsive to said second bus connect signal in a second state for resetting said first timeout, said first timer means generating a second timeout signal when said first and said second bus connect signals remain in said first state for said first predetermined time.

10. The system of claim 9 wherein said first timer means includes:
   first flop means coupled to said first timer means for storing said second timer signal and generating a third timer signal when a third bus connect signal is in a first state; and
   second flop means coupled to said first flop means for storing said third timer signal and generating said first timer signal when said not acknowledge signal is generated by said second timeout means.

11. The system of claim 10 wherein said first and said second memory means are responsive to said channel number signals and said enable signal for reading the contents of said location and generating first and second data signals for transfer to said central processor means, thereby making said first and said second data signal available to a program.

12. The system of claim 11 wherein said predetermined time is typically 5 microseconds and said first predetermined time is typically 3 microseconds.

13. A data processing system includes a plurality of subsystems all coupled in common to a system bus, one of said plurality of subsystems generating an input/output command over said system bus including a channel number identifying a peripheral subsystem of a plurality of peripheral subsystems of said plurality of subsystems, said one of said plurality of subsystems including apparatus for storing a response when said one of said plurality of peripheral subsystems responds to said channel number to accept said input/output command, said apparatus comprising:
   central processor means for generating channel number signals specifying said channel number, and a plurality of control signals for coupling said apparatus to said system bus;
   receiving means coupled to said system bus for receiving said response from said peripheral subsystem, said response including an acknowledge response when said peripheral subsystem can process said input/output command and a not acknowledge response when said peripheral subsystem cannot process said command;
   timing means coupled to said receiving means for starting a timeout when said one of said plurality of subsystems sends said input/output command to said peripheral subsystem and resetting said timeout when said response is received from said peripheral subsystem, said timing means generating a timeout response if said response is not received within a predetermined time; and
   response memory means coupled to said central processor means, said receiving means and said timing means and responsive to said control signals for enabling said response memory means to store an indication of said acknowledge response if said acknowledge response was received from said peripheral subsystem, and store an indication of said timeout response if said response was not received from said peripheral subsystem within said predetermined time, said indication of said acknowledge and said timeout responses being stored at a location specified by said channel number.

14. The apparatus of claim 13 wherein said central processor means further includes bus connect means for generating a plurality of bus connect signals for coupling said apparatus to said system bus.

15. The apparatus of claim 14 wherein said receiving means includes:
   bus disconnect means coupled to said bus connect means and responsive to said response for decoupling said apparatus from said system bus.

16. The apparatus of claim 15 wherein said receiving means further includes,
   flop means responsive to said acknowledge response for generating an acknowledge signal.

17. The apparatus of claim 16 wherein said timing means includes:
   first timer means coupled to said bus connect means and responsive to said plurality of bus connect signals for starting a first timeout and resetting said first timeout when said response is received by said bus disconnect means; and
   generating a first timeout signal when said response is not received by a first predetermined time.

18. The apparatus of claim 17 wherein said response memory means includes:
   first memory means for storing a first binary bit at said location specified by said channel number signals when said acknowledge response is received; and
   second memory means for storing a second binary bit at said location specified by said channel number signals when said response is not received by said predetermined time.

19. The apparatus of claim 18 wherein said response memory means further includes:
   logic means coupled to said central processor means and responsive to said plurality of control signals for generating write enable signals;
   said first memory means being coupled to said central processor means, said receiving means and said logic means and responsive to said write and said enable signals and said acknowledge signal for storing a binary ONE in said location specified by said channel number signals; and
   said second memory means being coupled to said central processor means, said first timer means and said logic means and responsive to said write and said enable signals and said first timing signal for storing a binary ONE in said location specified by said channel number signals.

20. The apparatus of claim 17 wherein said timing means further includes:
   second timer means coupled to said bus connect means and responsive to said plurality of bus connect signals for starting a second timeout and resetting said second timeout when said response is received by said bus disconnect means;
   and generating said not acknowledge response when said response is not received by said predetermined time.

21. The apparatus of claim 19 wherein said first and said second memory means are responsive to said channel number signals and said enable signal for reading the contents of said location and generating first and second data signals for transfer to said central processor means, thereby making said first and said second data signals available to a program.

* * * * *